(12) United States Patent
Kinoshita et al.

(10) Patent No.: US 8,528,154 B2
(45) Date of Patent: Sep. 10, 2013

(54) WIPER APPARATUS

(75) Inventors: Kazutoshi Kinoshita, Kariya (JP); Nobuyuki Shigeoka, Toyota (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 168 days.

(21) Appl. No.: 12/863,921

(22) PCT Filed: Jul. 2, 2009

(86) PCT No.: PCT/JP2009/062109
§ 371 (c)(1),
(2), (4) Date: Jul. 21, 2010

(87) PCT Pub. No.: WO2010/089909
PCT Pub. Date: Aug. 12, 2010

(65) Prior Publication Data
US 2011/0047739 A1    Mar. 3, 2011

(30) Foreign Application Priority Data
Feb. 4, 2009  (JP) ................................. 2009-024163

(51) Int. Cl.
*B60S 1/34* (2006.01)
*B60S 1/24* (2006.01)
*B60S 1/16* (2006.01)
*B60S 1/18* (2006.01)

(52) U.S. Cl.
USPC ..................................... 15/250.21; 15/250.31

(58) Field of Classification Search
USPC .............. 15/250.23, 250.31, 250.21, 250.351
IPC ...................... B60S 1/34, 1/24, 1/16, 1/36, 1/44
See application file for complete search history.

(56) References Cited

U.S. PATENT DOCUMENTS 4,683,605 A * 8/1987 Leroy et al. ................ 15/250.21
5,390,391 A * 2/1995 Zimmer et al. ........... 15/250.202

(Continued)

FOREIGN PATENT DOCUMENTS

GB    2 227 926 A    8/1990
JP    04-334643      11/1992

(Continued)

*Primary Examiner* — Joseph J Hail
*Assistant Examiner* — Marc Carlson
(74) *Attorney, Agent, or Firm* — Patterson Thuente Pedersen, P.A.

(57) ABSTRACT

A wiper apparatus is provided that reduces protrusion of a cover at a storage position of a wiper arm, and improves the appearance of the vehicle. A first link between shafts at the lower section of a four-link mechanism is formed by a mounting portion formed on a vehicle body. A second link and a third link at both ends of the first link are formed by link levers. A fourth link L4 between the end portions of the second link and the third link is formed by the proximal end portion of the first wiper arm. A cover is mounted on the proximal end portion of the first wiper arm. One of the pair of link levers, that is, the second link lever arranged closer to the wiper blade has a recess, which is recessed in the direction of a link shaft to prevent contact with the cover.

5 Claims, 11 Drawing Sheets

(56) References Cited

U.S. PATENT DOCUMENTS

| | | | |
|---|---|---|---|
| 5,860,186 A * | 1/1999 | Schael et al. | 15/250.21 |
| 5,884,357 A * | 3/1999 | Schill et al. | 15/250.21 |
| 5,920,948 A | 7/1999 | Hayashi et al. | |
| 6,119,301 A * | 9/2000 | Nakatsukasa et al. | 15/250.21 |
| 6,314,607 B1 * | 11/2001 | Kinoshita | 15/250.21 |
| 6,564,419 B2 * | 5/2003 | Matsumoto et al. | 15/250.21 |
| 6,568,022 B1 * | 5/2003 | Zimmer | 15/250.21 |
| 6,606,759 B1 * | 8/2003 | Hoshino | 15/250.21 |
| 6,662,400 B1 * | 12/2003 | Zimmer | 15/250.21 |
| 6,772,470 B2 * | 8/2004 | Zimmer | 15/250.21 |
| 6,775,878 B2 * | 8/2004 | Heinrich et al. | 15/250.21 |
| 7,076,829 B2 * | 7/2006 | Ritt | 15/250.351 |
| 7,257,856 B2 * | 8/2007 | Zimmer | 15/250.21 |
| 7,565,728 B2 * | 7/2009 | Kraus et al. | 29/428 |
| 8,209,813 B2 * | 7/2012 | Igarashi et al. | 15/250.3 |
| 2002/0100137 A1 * | 8/2002 | Matsumoto et al. | 15/250.21 |
| 2003/0005539 A1 * | 1/2003 | Kuehbauch | 15/250.21 |
| 2007/0067938 A1 * | 3/2007 | Zimmer | 15/250.21 |

FOREIGN PATENT DOCUMENTS

| | | |
|---|---|---|
| JP | 10-278744 | 10/1998 |
| JP | 2003-534972 | 11/2003 |
| JP | 2006-514592 | 5/2006 |
| JP | 2006321443 A * | 11/2006 |

* cited by examiner

WIPER APPARATUS

The present application is a National Phase entry of PCT Application No. PCT/JP2009/062109, filed Jul. 2, 2009, which claims priority from Japanese Patent Application Number 2009-024163, filed Feb. 4, 2009, the disclosures of which are hereby incorporated by reference herein in their entirety.

FIELD OF THE INVENTION

The present invention relates to a wiper apparatus for wiping a windshield glass such as a front window glass of an automobile (hereinafter, referred to as a windshield).

BACKGROUND OF THE INVENTION

The wiper apparatus generally includes a wiper arm, which is pivotable about a shaft, and a wiper blade, which is supported by the wiper arm and wipes, for example, a windshield. With this structure, the wiper blade moves arcuately with the wiper arm about the shaft and wipes a sectorial area of the windshield. When such a structure is employed, the length of the wiper blade needs to be increased to increase the wiping area wiped by the wiper blade. However, it is desired that the wiping area be increased without increasing the length of the wiper blade.

To respond to the demand, for example, the structure disclosed in Patent Document 1 is embodied. In the conventional structure, a four-link mechanism shown in FIGS. 8 to 10 is used as the operating mechanism of the wiper arm. As shown in FIG. 9, the four-link mechanism L includes four shafts 43, 44, 46, 47, which are parallel to one another. FIGS. 8 and 10 are diagrams viewed along the direction in which axes C1, C2, C3, C4 of the shafts 43, 44, 46, 47 extend. FIG. 9 is a diagram viewed along the direction perpendicular to the direction in which the axes C1, C2, C3, C4 extend. As shown in FIGS. 8 and 9, a pair of link levers 41, 42 is mounted on a mounting portion formed on a vehicle body such as a blackout section at the lower part of the windshield and a body panel of the vehicle below the windshield. The lower ends of the link levers 41, 42 are pivotably supported by the shafts 43, 44, respectively. The proximal end of a wiper arm 45 is coupled to the distal ends of the link levers 41, 42 via the shafts 46, 47. That is, the distal ends of the link levers 41, 42 are connected by the proximal end of the wiper arm 45. A wiper blade 48 is supported at the distal end of the wiper arm 45.

A first link L1 of the four-link mechanism L is formed at the above-mentioned mounting portion by the section between the shafts 43, 44. A second link L2 is formed by one of the pair of link levers 41, 42, that is, the first link lever 41 located away from the wiper blade 48. A third link L3 if formed by one of the pair of link levers 41, 42, that is, the second link lever 42 located close to the wiper blade 48. A fourth link L4 is formed by part of the wiper arm 45 located between the shafts 46, 47.

As shown in FIG. 9, a drive mechanism 49 including a motor (not shown) is connected to the shaft 43 supporting the first link lever 41. When the drive mechanism 49 causes the first link lever 41, in other words, the second link L2 of the four-link mechanism L to pivot back and forth about the shaft 43 within a predetermined range, the third link L3 and the fourth link L4 of the four-link mechanism L pivot in accordance with the pivoting motion of the second link L2. As a result, the wiper arm 45 pivots back and forth between a storage position shown in FIG. 8 and an upright position shown in FIG. 10, and thus the wiper blade 48 wipes the windshield. The pivoting motion of the wiper arm 45 is the combination of the pivoting motion of the entire wiper arm 45 about the shaft 46 and the pivoting motion of the proximal end of the wiper arm 45 coupled to the shaft 46 about the shaft 43. As a result, the area of the windshield wiped by the wiper blade 48 is increased.

Patent Document 1: Japanese National Phase Laid-Open Patent Publication 2006-514592

DISCLOSURE OF THE INVENTION

Problems that the Invention is to Solve

In the wiper apparatus including this kind of four-link mechanism, the first and second link levers 41, 42 coupled by the shafts 46, 47 are additionally mounted on the wiper arm 45 as compared to the structure in which the wiper arm is supported by one shaft. Exposure of the link levers 41, 42 to the outside can deteriorate the appearance of the vehicle body.

To solve this problem, the first and second link levers 41, 42 may be shortened, or the position of the shafts 46, 47 may be lowered by lowering the mounting position of the entire wiper apparatus. However, if the first and second link levers 41, 42 are shortened, the radius with which the proximal end of the wiper arm 45 pivot about the shaft 43 is shortened, which reduces the wiping area of the wiper blade 48. Since various types of components are arranged below the mounting position of the wiper apparatus on the vehicle body, it is difficult to create the space for lowering the wiper apparatus.

Therefore, the structure may be employed in which a cover 50 for hiding the upper part of the four-link mechanism L is secured to the proximal end of the wiper arm 45. The cover 50 includes a bottom wall 50a, which hides the four-link mechanism L from the front of the vehicle body, and a side wall 50b, which hides the four-link mechanism L from above and the side of the vehicle body. The four-link mechanism L is hidden by such a cover 50. However, in some cased, the edge portion of the cover 50 in the vicinity of the first link lever 41 bulges forward of the vehicle body for the following reason. Thus, there remains a challenge in improving the appearance of the vehicle body.

That is, the wiper blade 48 supported by the wiper arm 45 wipes the glass surface with an edge 48a at its distal end as shown in FIG. 11. During the wiping operation, the edge 48a is preferably displaced rearward of the moving direction of the wiper blade 48 (the direction of arrow in FIG. 11) with respect to a proximal end 48b of the wiper blade 48. That is, the edge 48a preferably does not move as to scoop the rainwater on the glass surface, but moves as to sweep along the glass surface. Thus, as shown in FIG. 11, it is preferable that the wiper blade 48 start moving from the state in which the edge 48a is displaced rearward in the direction in which the wiper blade 48 is to move at the storage position, which is the bottom dead center, and the upright position, which is the top dead center. In order to make this possible, the structure may be employed in which an axis 52 of the wiper arm 45, in other words, all the axes of the four-link mechanism L tilt forward toward the section between the bottom dead center and the top dead center on the glass surface.

When such a structure is employed, the proximal end of the wiper arm 45, which is supported by the shafts 46, 47, protrudes forward of the vehicle body as shown in FIG. 9. Thus, the cover 50 secured to the wiper arm 45 also protrudes in the same manner. In this case, if the coupling portion between the wiper arm 45 and the first link lever 41 is placed close to the windshield, the wiper arm 45 and cover 50 are prevented from protruding. In order to bring the coupling portion close to the windshield, for example, the wiper arm 45 may be made thin, or the shaft 46 may be made short. However, if the wiper arm 45 is made thin, the strength of the wiper arm 45 is likely to be insufficient. If the shaft 46 is shortened, the cover 50, in particular, the side wall 50b of the cover 50 is likely to contact the second link lever 42 as apparent from FIGS. 8 and 10 when the wiper arm 45 is at the upright position. This hinders the operation of the wiper arm 45. Thus, the protrusion of the cover 50 needs to be tolerated, which has an adverse effect on the form of the entire vehicle body as described below.

That is, in the vehicle body in which the hood 25 has a small inclination and the windshield 24 has a great inclination, a wide space is created between the hood 25 and the lower part of the windshield 24 or the vehicle body below the windshield 24 as shown in FIG. 12. Thus, the protrusion of the cover 50 is unobtrusive. However, since the step between the hood 25 and the windshield 24 is small in the vehicle body formed with flowing lines in which the inclination of the hood 25 and the inclination of the windshield 24 are substantially the same as shown in FIG. 13, a wide space cannot be created between the hood 25 and the windshield 24 in some cases. In this case, the protrusion of the cover 50 stands out, and deteriorates the design of the vehicle body.

Accordingly, it is an objective of the present invention to provide a wiper apparatus that includes a wiper arm with a cover having a reduced protruding amount, and improves the appearance of the vehicle.

Means for Solving the Problems

To achieve the foregoing objective, one aspect of the present invention provides a wiper apparatus including a wiper arm, a wiper blade supported by the wiper arm, and a four-link mechanism, which pivots the wiper arm. The four-link mechanism includes two shafts, a first link, second link, third link, and a forth link. The two shafts are fixed to a mounting portion formed on a vehicle body at a predetermined interval. The first link is formed by part of the mounting portion between the shafts. The second and third links are formed by first and second link levers. The first and second link levers have proximal ends pivotably supported by the two shafts. The forth link is formed by a proximal end of the wiper arm, which is pivotably coupled to distal ends of the second and third links. The second link lever is arranged closer to the wiper blade than the first link lever. A cover is mounted on the proximal end of the wiper arm to hide the second and third links. A recess is formed at a position on the second link lever corresponding to a pivot range of the cover. The recess is recessed along the direction in which the shafts extend.

Since the recess, which is recessed in a direction in which a link shaft extends, is formed on the link lever, the cover is prevented from contacting the link lever when the wiper arm is pivoted even if the cover is arranged close to the windshield so that the cover does not protrude forward. Thus, the amount by which the cover protrudes forward is reduced.

A middle portion of the second link lever in the longitudinal direction preferably protrudes toward the mounting portion.

The recess may be formed in a middle portion of the second link lever in the longitudinal direction.

The cover may include a bottom wall for hiding the four-link mechanism from the front of the vehicle body and a side wall for hiding the four-link mechanism from above and the side of the vehicle body.

When the wiper arm is pivoted, the cover preferably passes the side of the recess.

Effects of the Invention

As described above, the present invention reduces the protruding amount of the cover at the storage position of the wiper arm, and improves the appearance of the vehicle.

DETAILED DESCRIPTION OF THE INVENTION

One embodiment of the present invention will now be described with reference to FIGS. 1 to 7.

Figure 1:
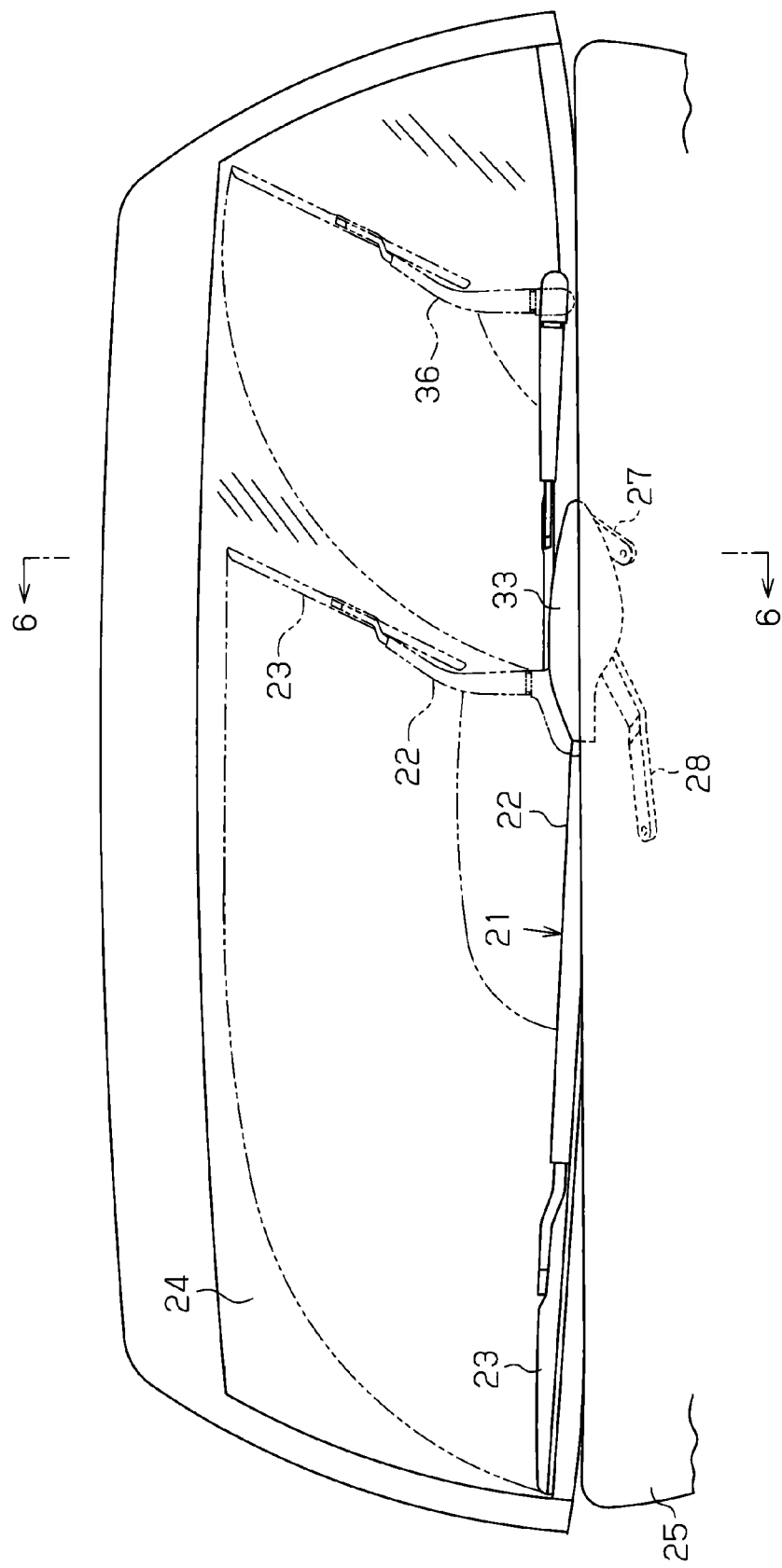
FIG. 1 is a front view illustrating a part of a vehicle including a wiper apparatus according to one embodiment of the present invention.
Figure 2:
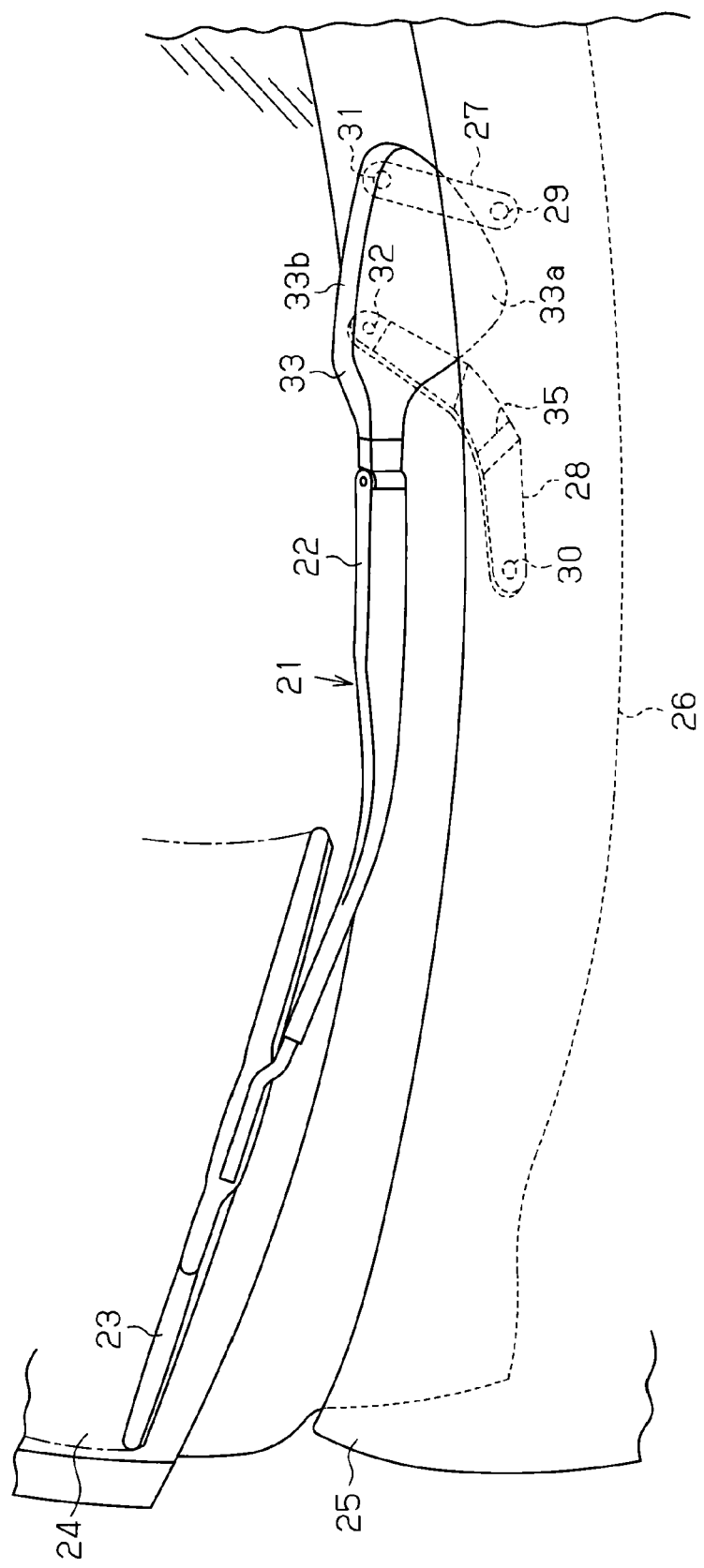
FIG. 2 is an enlarged plan view illustrating the vehicle including the wiper apparatus of FIG. 1.
Figure 3:
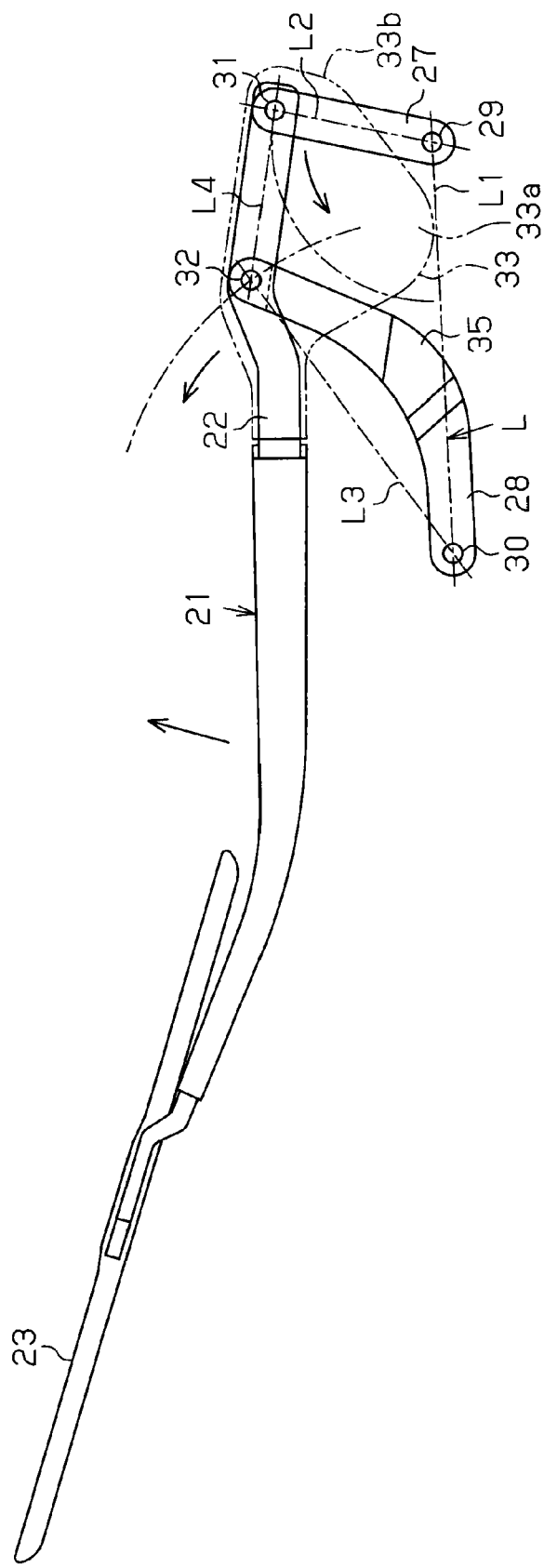
FIG. 3 is a front view illustrating a link structure of the wiper apparatus in a state where the wiper arm is at a storage position.

As shown in FIGS. 1 to 3, a wiper apparatus 21 of the present embodiment includes a first wiper arm 22 and a second wiper arm 36. The rotational center of the first wiper arm 22 is located at a central portion in the widthwise direction of a vehicle body. The rotational center of the second wiper arm 36 is located in the vicinity of the end portion in the widthwise direction of the vehicle body. A four-link mechanism L is used as an operating mechanism of the first wiper arm 22. The four-link mechanism L increases the area of a windshield 24 wiped by a wiper blade 23 coupled to the first wiper arm 22.

Figure 4:
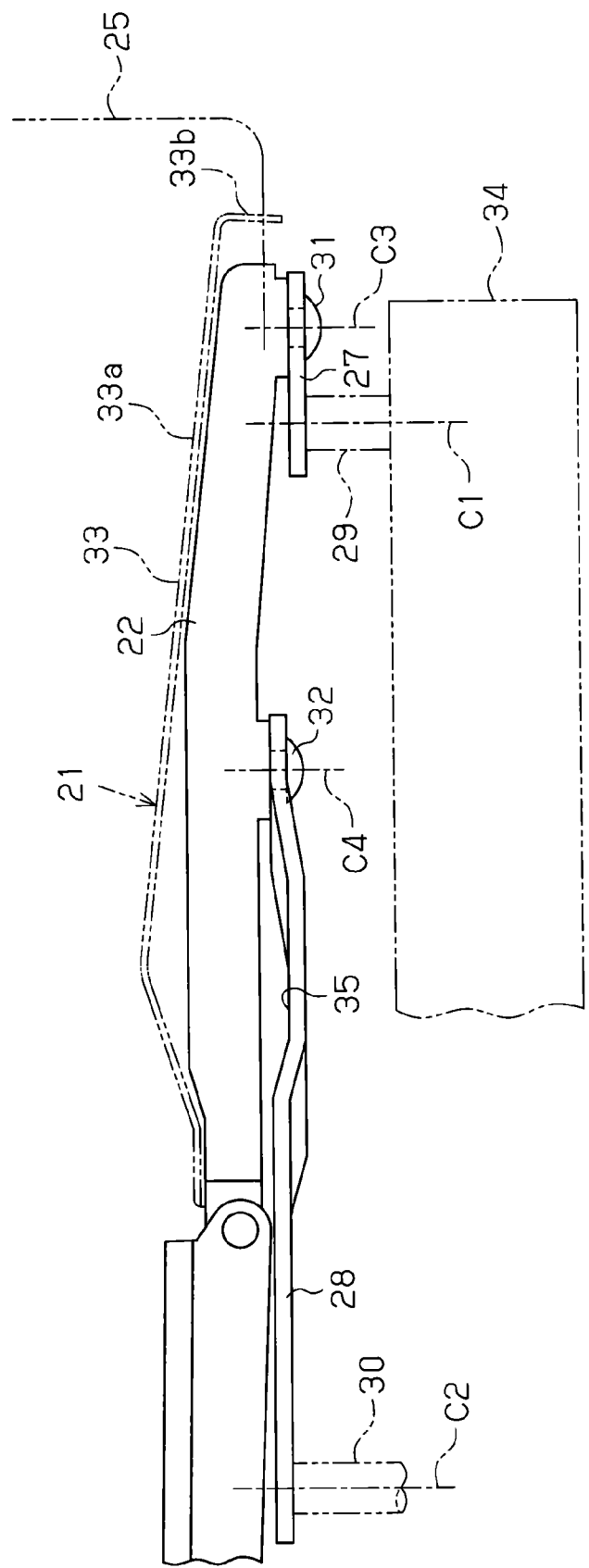
FIG. 4 is a plan view looking from direction P in FIG. 6.

That is, as shown in FIGS. 1 and 2, shafts 29, 30 are fixed at a predetermined interval to a mounting portion 26 formed on the vehicle body such as a black-out portion at the lower end of the windshield 24 and a vehicle body panel below the windshield 24. The shafts 29, 30 pivotably support first and second link levers 27, 28. The second link lever 28 is arranged closer to the wiper blade 23 than the first link lever 27. The second link lever 28 substantially has a boomerang like shape, and the middle portion in the longitudinal direction projects downward, in other words, toward the mounting portion 26. The proximal end of the first wiper arm 22 is pivotably coupled to the distal ends (upper ends) of the link levers 27, 28 via shafts 31, 32. The wiper blade 23 is supported at the distal end of the first wiper arm 22. As shown in FIG. 4, the axes C1, C2, C3, C4 of the shafts 29, 30, 31, 32 are inclined forward toward the section between the bottom dead center and the top dead center on the glass surface as in the above-mentioned conventional structure.

Figure 6:
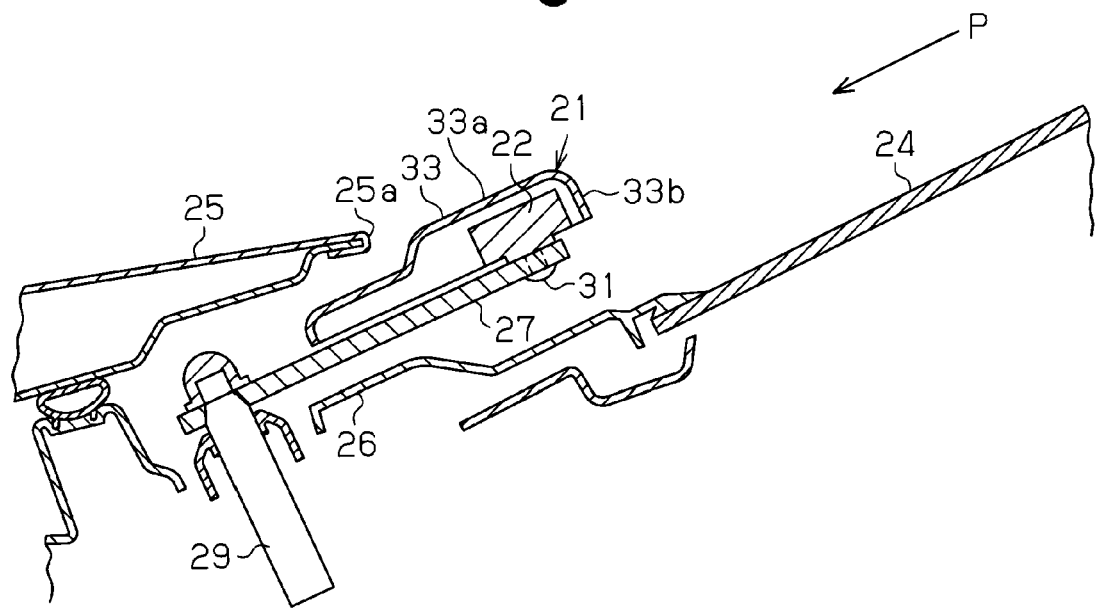
FIG. 6 is a cross-sectional view taken along line 6-6 in FIG. 1.

A cover 33 is mounted on the proximal end of the first wiper arm 22. The cover 33 is located between the first wiper arm 22 and a hood 25. As shown in FIGS. 4 and 6, the cover 33 includes a bottom wall 33a and a side wall 33b. The side wall 33b is formed to surround the entire bottom wall 33a. The bottom wall 33a of the cover 33 hides the front surface at the proximal end of the first wiper arm 22, and the front surface at the upper end of the first and second link levers 27, 28. The side wall 33b of the cover 33 hides the side surface, the upper surface, and the lower surface of the proximal end of the first wiper arm 22 and the first and second link levers 27, 28. That is, the bottom wall 33a of the cover 33 hides the four-link mechanism L from the front of the vehicle body, and the side wall 33b hides the four-link mechanism L from above and the side of the vehicle body.

As shown in FIG. 1, in the state where the first wiper arm 22 is arranged at a storage position, the first and second link levers 27, 28 are located below the rear edge of the hood 25, and the upper part of the cover 33 is exposed to the outside. As shown in FIG. 4, part of the first wiper arm 22 between the first and second link levers 27, 28 is bent toward the windshield 24. Thus, the section coupled to the shaft 31 is close to the windshield 24. The cover 33 is close to the windshield 24 in accordance with the shape of the first wiper arm 22.

Figure 5:
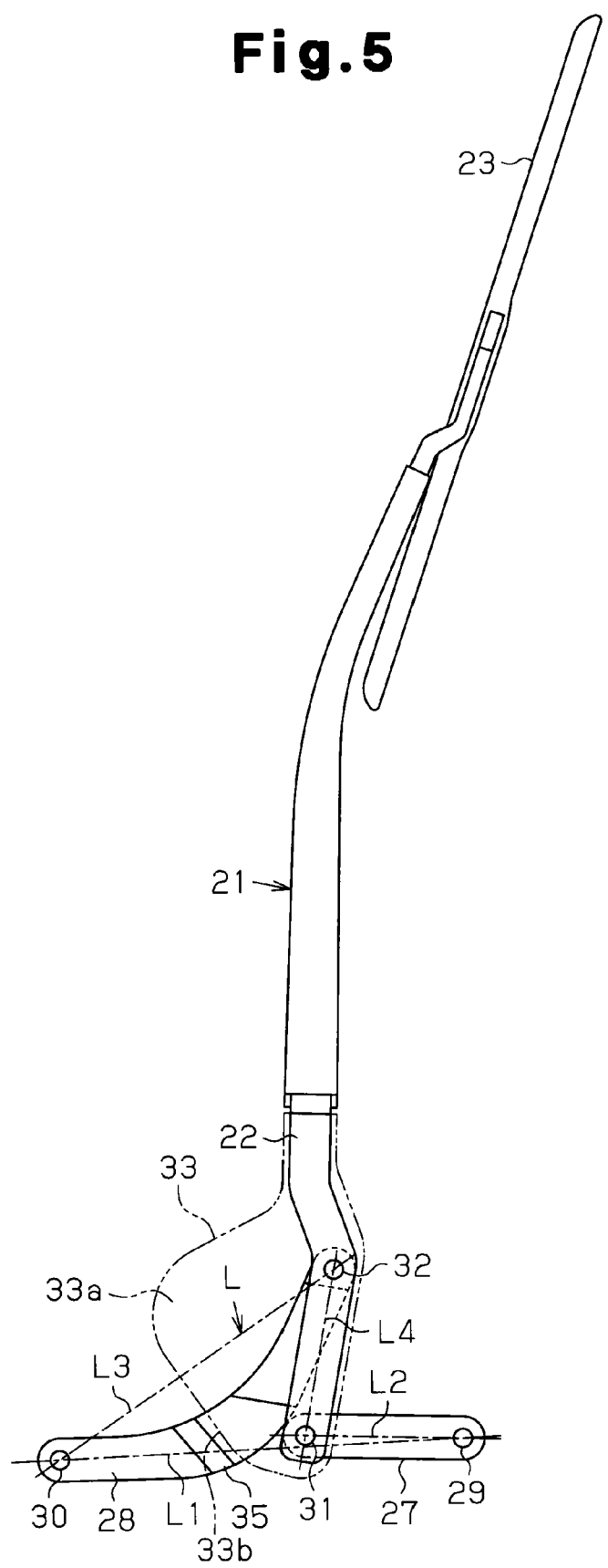
FIG. 5 is a front view illustrating the wiper apparatus showing the link structure of the wiper apparatus in a state where the wiper arm is at an upright position.

As shown in FIGS. 3 and 5, a part of the mounting portion 26 between the shafts 29, 30 forms a first link L1 of the four-link mechanism L. The first link lever 27 forms a second link L2 of the four-link mechanism L, and the second link lever 28 forms a third link L3 of the four-link mechanism L. The proximal end of the first wiper arm 22 between the shafts 31, 32 forms a fourth link L4 of the four-link mechanism L.

As shown in FIG. 4, a drive mechanism 34 including, for example, a motor is connected to the shaft 29 of the first link lever 27. The drive mechanism 34 is coupled to the shaft of the first wiper arm 22 via a coupling mechanism, which is not shown. During operation of the wiper apparatus 21, the drive mechanism 34 causes the first link lever 27 to pivot back and forth about the shaft 29 within a predetermined range, which causes the second link lever 28 to pivot about the shaft 30 based on the pivoting motion of the first wiper arm 22. As a result, the first wiper arm 22 pivots back and forth between a bottom dead center position shown by the solid line in FIG. 1, that is, a storage position, and a top dead center position shown by the chain line in FIG. 1, that is, an upright position. The reciprocating pivoting motion is the combination of the pivoting motion of the entire wiper arm 45 about the shaft 31 and the pivoting motion of the proximal end of the first wiper arm 22 coupled to the shaft 31 about the shaft 29. This increases the area of the windshield 24 wiped by the wiper blade 23. The second wiper arm 36 performs simple arcuate motion by the drive mechanism 34.

Figure 7:
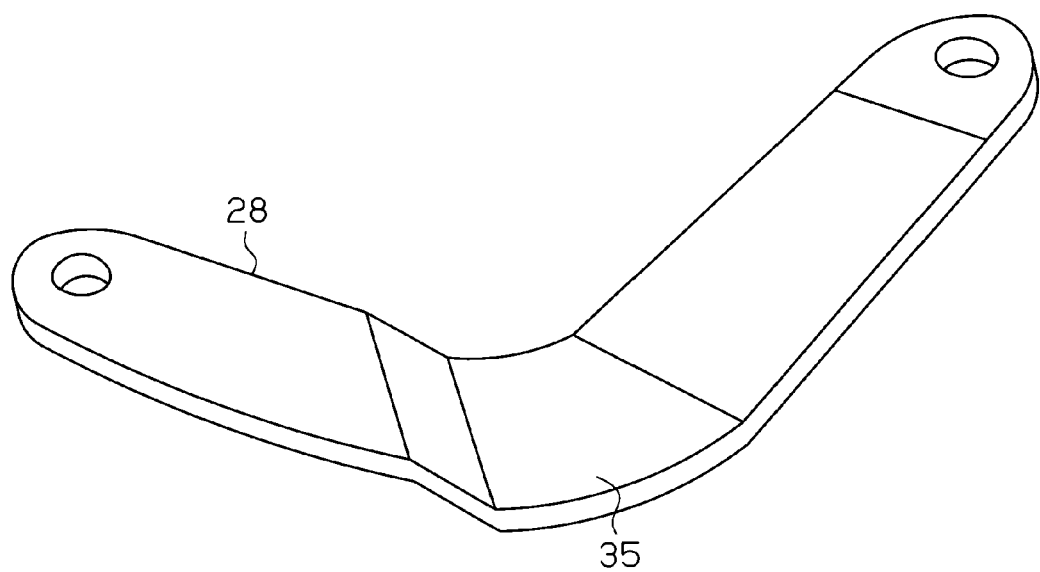
FIG. 7 is a perspective view illustrating the second link lever.
Figure 8:
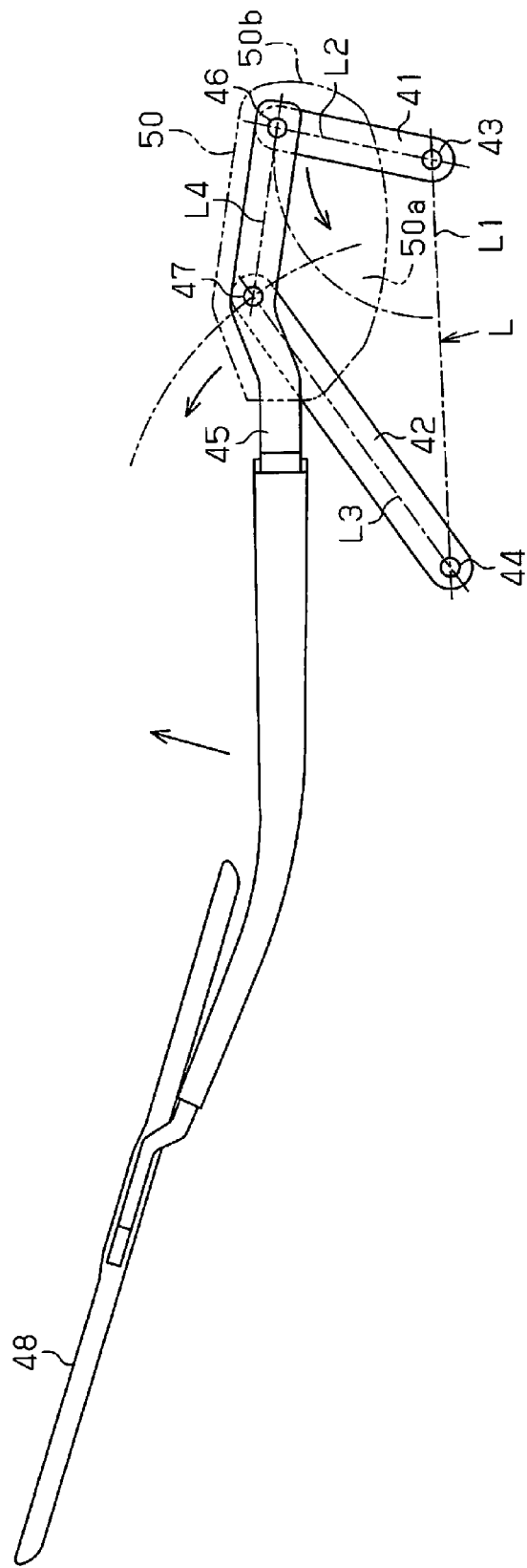
FIG. 8 is a front view illustrating a link structure of a conventional wiper apparatus in a state where a wiper arm is at a storage position.
Figure 9:
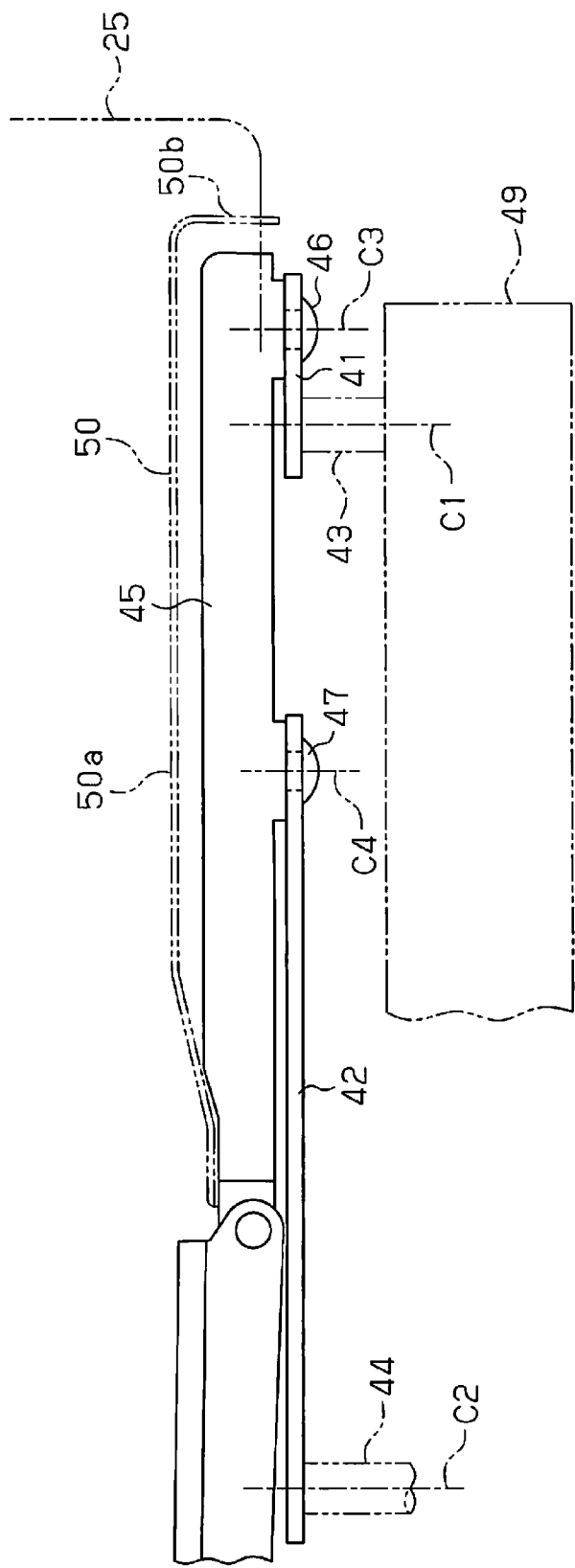
FIG. 9 is a plan view illustrating the conventional wiper apparatus.
Figure 10:
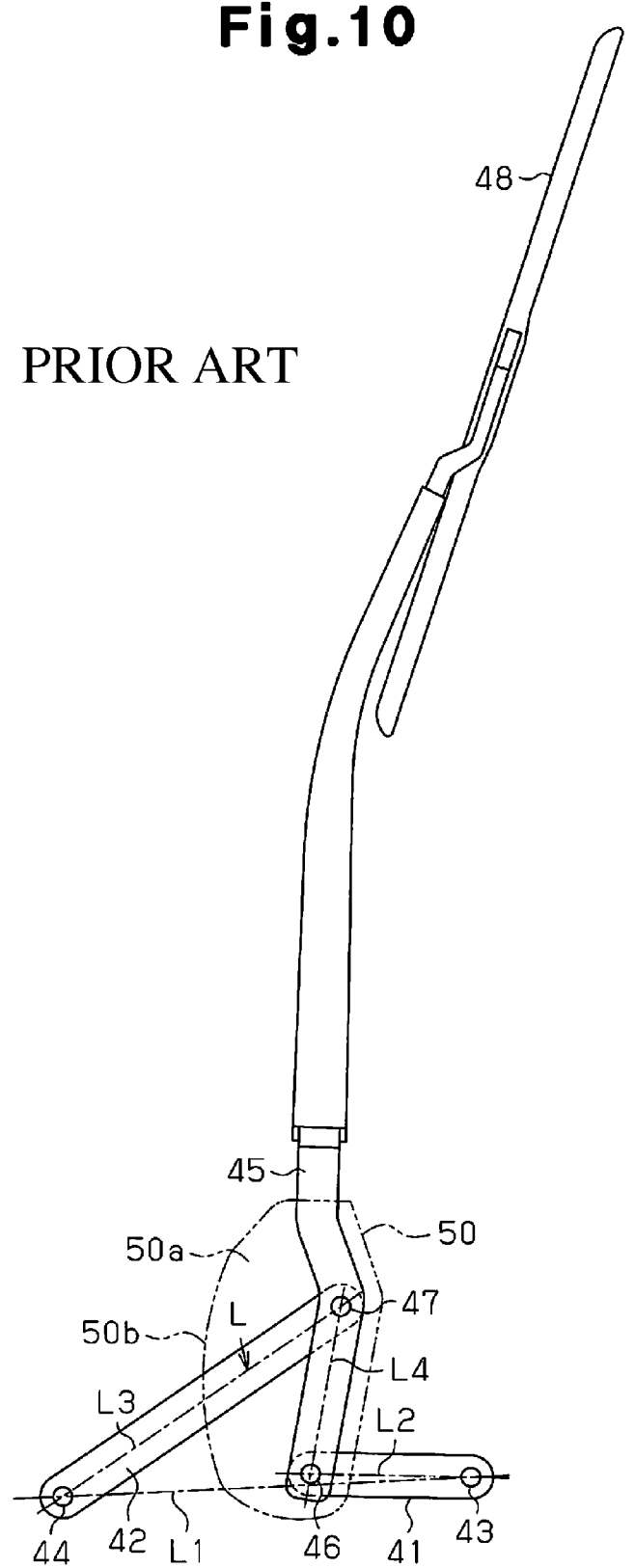
FIG. 10 is a front view illustrating the link structure of the conventional wiper apparatus in a state where the wiper arm is at an upright position.
Figure 11:
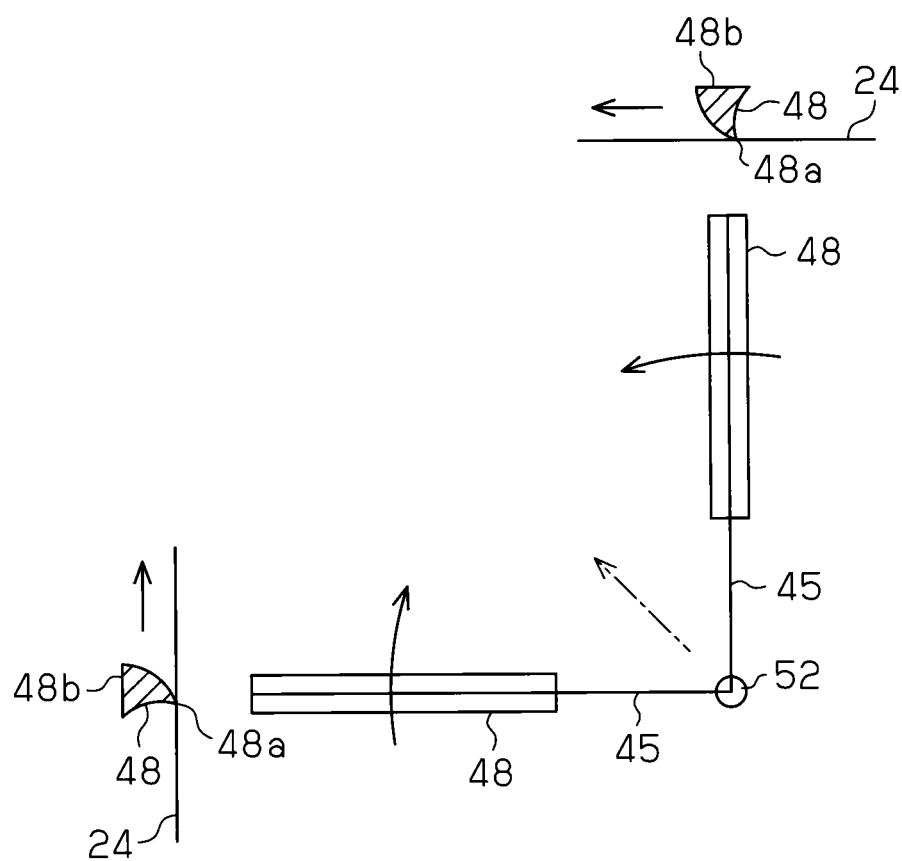
FIG. 11 is a schematic diagram showing an operation of the wiper blade.
Figure 12:
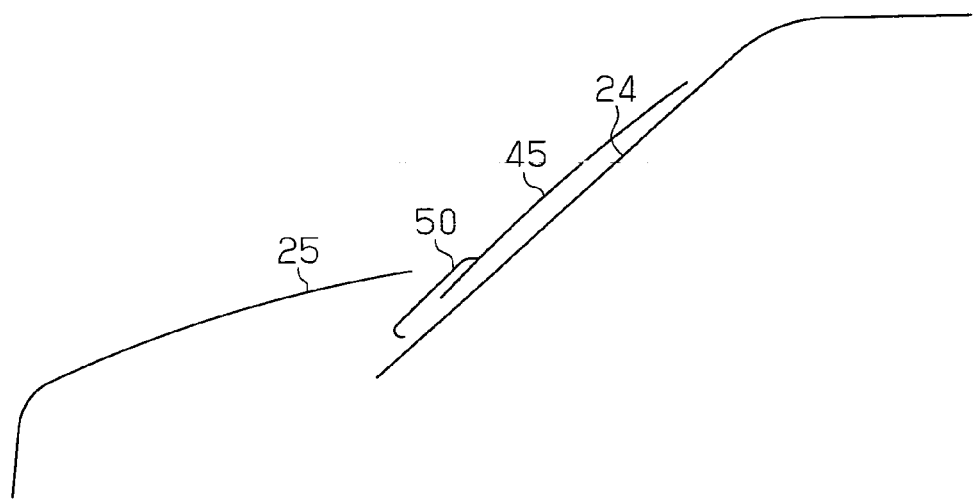
FIG. 12 is a schematic diagram showing the form of a vehicle body.

As shown in FIGS. 4 and 7, a recess 35 is formed on part of the second link lever 28 corresponding to the pivot range of the cover 33. The recess 35 is recessed toward the windshield 24 along the direction in which the shaft 29 extends. The recess 35 is formed at in middle part of the second link lever 28 in the longitudinal direction. With this structure, as shown in FIGS. 4 and 5, the cover 33 passes the side of the recess 35 when the first wiper arm 22 is pivoted, and part of the cover 33 facing the windshield 24 is prevented from contacting the second link lever 28 when the first wiper arm 22 is pivoted to the upright position.

As described above, the recess 35, which is recessed in the link axial direction, is formed on the second link lever 28, which forms the third link L3 of the four-link mechanism L according to the wiper apparatus 21 of the present embodiment. Thus, the cover 33 is prevented from contacting the second link lever 28 when the first wiper arm 22 comes to the upright position during pivoting motion of the first wiper arm 22.

The present embodiment has the following advantages.

Figure 13:
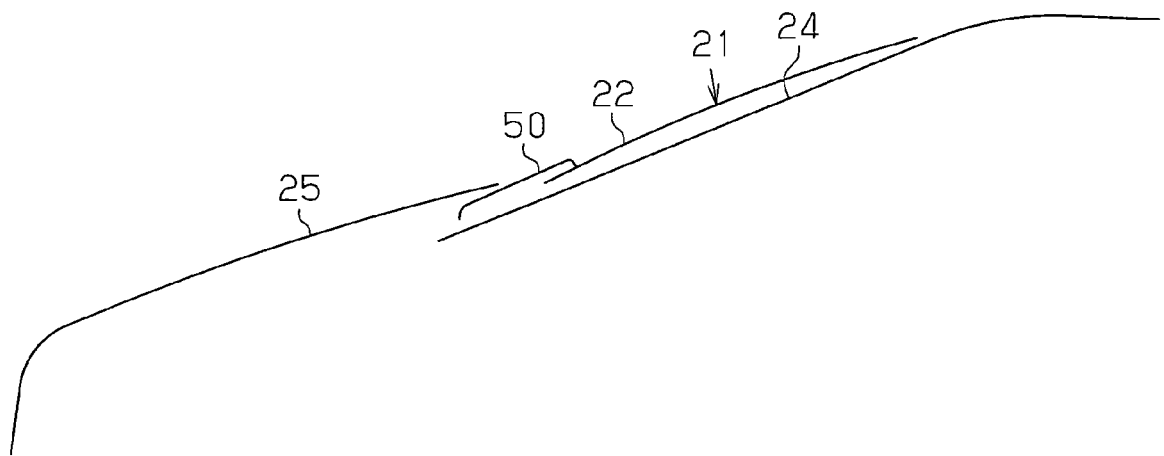
FIG. 13 is a schematic diagram showing the form of a vehicle body.

(1) The recess 35, which is recessed in the direction in which the shaft 29 extends, is formed in the second link lever 28. Thus, part of the cover 33 close to the first link lever 27 does not protrude toward the hood 25. Accordingly, although the cover 33 approaches the windshield 24, the cover 33 is prevented from contacting the second link lever 28 when the first wiper arm 22 is pivoted. Thus, the appearance of the vehicle body is improved. In particular, when the wiper apparatus 21 of the present embodiment is mounted on a vehicle body in which the hood 25 and the windshield 24 are inclined substantially at the same angle as shown in FIG. 13, the form of the vehicle body is prevented from being deteriorated.

(2) The cover 33 is prevented from protruding simply by forming the recess 35 in the second link lever 28. Thus, it is not necessary to increase the number of components of the wiper mechanism to prevent protrusion of the cover 33, which simplifies the mechanism.

(3) The second link lever 28 is formed such that the middle portion in the longitudinal direction protrudes downward, in other words, toward the mounting portion 26. Thus, the middle portion is located below the rear edge of the hood 25. As a result, even if the second link lever 28 is long, it does not standout. Thus, the appearance of the vehicle body is improved.

(Modifications)

The present embodiment may be modified as follows.

The second link lever 28 may be formed straight.

The wiper apparatus of the present embodiment may be embodied in an apparatus for a rear window glass.

The invention claimed is:

1. A wiper apparatus for wiping a window glass comprising a wiper arm, a wiper blade supported by the wiper arm, and a four-link mechanism, which pivots the wiper arm,
wherein the four-link mechanism includes two shafts, a first link, a second link, a third link, and a fourth link, the two shafts being fixed to a mounting portion formed on a vehicle body at a predetermined interval, the first link being formed by part of the mounting portion between the shafts, the second and third links being formed by first and second link levers that have proximal ends pivotably supported by the two shafts, the fourth link being formed by a proximal end of the wiper arm, which proximal end is pivotably coupled to distal ends of the second and third links, the second link lever being arranged closer to the wiper blade than the first link lever, and a cover is mounted on the proximal end of the wiper arm to hide the second and third links, wherein the second link lever presents a first planar end and a second planar end and defines a planar recessed portion, recessed toward the window glass, between the first planar end and the second planar end located to create clearance for the cover throughout a pivot range of the cover, wherein the first planar end and the second planar end of the second link lever define a first plane substantially normal to the shaft axis and the planar recessed portion defines a second plane offset from the first plane, and wherein part of the wiper arm between the first and second link levers is bent toward the window glass so that the proximal end of the wiper arm is close to the window glass, and the cover is close to the window glass in accordance with the shape of the wiper arm.

2. The wiper apparatus according to claim 1, wherein a middle portion of the second link lever in the longitudinal direction protrudes toward the mounting portion.

3. The wiper apparatus according to claim 1, wherein the recess is formed in a middle portion in the longitudinal direction of the second link lever.

4. The wiper apparatus according to claim 1, wherein the cover includes a bottom wall for hiding the four-link mechanism from the front of the vehicle body and a side wall for hiding the four-link mechanism from above and the side of the vehicle body.

5. The wiper apparatus according to claim 1, wherein when the wiper arm is pivoted, the cover passes the side of the recess.

\* \* \* \* \*